United States Patent [19]

Everett

[11] Patent Number: 4,478,253

[45] Date of Patent: Oct. 23, 1984

[54] EROSION RESISTANT ELBOW FOR SOLIDS CONVEYANCE

[75] Inventor: James W. Everett, New Stanton, Pa.

[73] Assignee: KRW Energy Systems Inc., Houston, Tex.

[21] Appl. No.: 483,404

[22] Filed: Apr. 8, 1983

[51] Int. Cl.³ .......................... F16L 9/04; F16L 55/00
[52] U.S. Cl. ..................................... 138/140; 138/149; 406/193
[58] Field of Search .................. 285/55, 179; 406/191, 406/193; 138/140, 143, 149

[56] References Cited

U.S. PATENT DOCUMENTS

| | | | |
|---|---|---|---|
| 2,405,075 | 7/1946 | Vollrath | 138/140 |
| 3,714,971 | 2/1973 | Venable | 138/143 |
| 4,117,868 | 10/1978 | Pignocco et al. | 138/140 |
| 4,199,010 | 4/1980 | McGuth et al. | 138/140 |
| 4,251,170 | 2/1981 | Sheridan | 285/179 |

Primary Examiner—John W. Shepperd
Attorney, Agent, or Firm—William E. Otto

[57] ABSTRACT

An elbow and process for fabrication for use in particulate material conveyancing comprising a curved outer pipe, a curved inner pipe having the same radius of curvature as the outer pipe, concentric with and internal to the outer pipe, comprising an outer layer comprised of a first material and an inner layer comprised of a second material wherein said first material is characterized by high erosion resistance when impinged by particulate material and wherein said second material is characterized by high tensile strength and flexibility, and an inner pipe supporting means for providing support to said inner pipe, disposed between said inner pipe and said outer pipe.

5 Claims, 4 Drawing Figures

EROSION RESISTANT ELBOW FOR SOLIDS CONVEYANCE

GOVERNMENT CONTRACT

The invention disclosed herein was made or conceived in the course of or under a contract with the United States Department of Energy identified as number DE-AC01-80-ET-14752.

BACKGROUND OF THE INVENTION

1. Field of the Invention

This invention relates to apparatus for conveying a gaseous stream containing particulate matter and more particularly to conveying such a stream in conjunction with systems for the gasification of carbonaceous materials.

2. Description of the Prior Art

Process systems for gasifying solid carbonaceous materials, such as coal, typically involve conveying particulate material entrained in gaseous streams at a wide range of temperatures and pressures. Temperatures can range anywhere from ambient up to 1800° F. or higher. Pressures can range from atmospheric up to 500 lbs./square inch or higher. In a typical fluidized bed coal gasification system, particles of coal are conveyed from a feed source, such as a coal lockhopper, and injected into a gasifier vessel. The typical method of conveyance is by entrainment of the particles in a gaseous process medium, such as a recycled product gas. The product gas discharged from the gasification vessel may typically comprise a mixture of combustible product gas, ungasified coal particles, partially gasified coal particles called char, or liquid globules of molten ash, which typically is made up of one or more compounds of any of $Fe_{1-x}S$, Fe, Na, Al, K or $SiO_x$. These different particles and globules are generally collectively called fines. In order to use the combustible product gas, it is necessary to separate these entrained fines from the gas, and this is typically done through the use of a centrifugal separator. However, since the fines may contain residual amounts of carbon, recycle of these fines back into the gasifier vessel would be beneficial. Further, since these fines already contain significant residual heat, it would be advantageous to recycle them at as high a temperature as is possible.

Previously existing systems have generally conveyed such fines in pipes made of materials such as carbon steel or refractory ceramic. These materials, however, have poor characteristics of erosion, tensile strength, flexibility, insulation or a combination of several. Materials which have very good erosion resistance typically will have very poor fabrication properties, such as poor bending qualities or high brittleness.

In general, solids conveyancing means of the prior art are directed towards straight-line flow problems and any interior lining is generally of a single material. Any such liner will represent a tradeoff between a material with favorable pipe fabrication qualities and a material with favorable erosion resistance qualities. Further, because erosion resistance varies with the radius of curvature, what may have satisfactory wear characteristics for straight pipes might have to be replaced in the event that a curve or flow perturbations or other problems cause the single material to wear out.

What is needed is an apparatus which will allow a change in direction of flowing particulate solids, have the ability to adapt to flow perturbations, have satisfactory erosion, tensile strength and flexibility characteristics, and be suitable for use at varying temperatures without substantial loss of heat.

SUMMARY OF THE INVENTION

An elbow, and process for fabrication, for use in particulate material conveyancing comprising a curved outer pipe, a curved inner pipe having the same radius of curvature as the outer pipe, concentric with and internal to the outer pipe, comprising an outer layer comprised of a first material and an inner layer comprised of a second material wherein said first material is characterized by high erosion resistance when impinged by particulate material and wherein said second material is characterized by high tensile strength and flexibility, and an inner pipe supporting means for providing support to said inner pipe, disposed between said inner pipe and said outer pipe.

BRIEF DESCRIPTION OF THE DRAWINGS

The advantages, nature and additional features of the invention will become more apparent from the following description taken in connection with the accompanying drawings in which.

DESCRIPTION OF THE PREFERRED EMBODIMENTS

Figure 1:
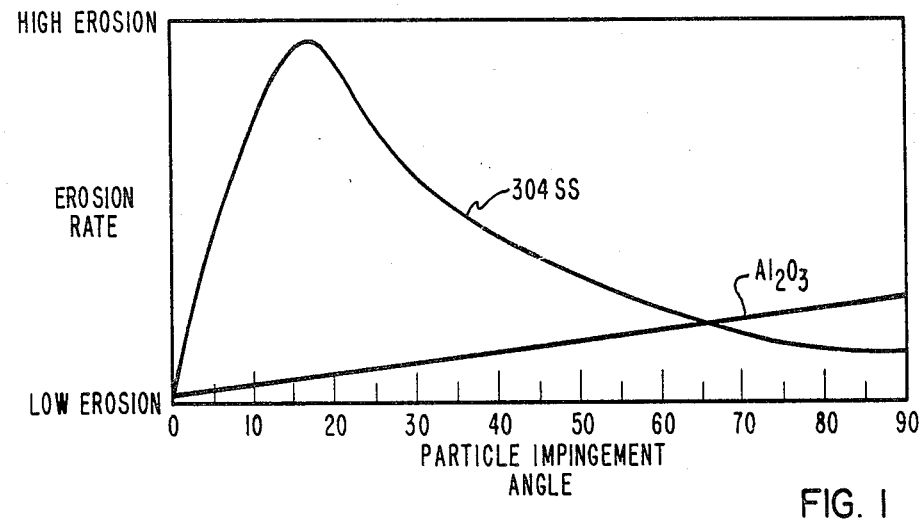
FIG. 1 is a graphical representation of erosion rate versus particle impingement angle for $Al_2O_3$ and 304 SS.

Referring now to FIG. 1, there is shown a graphical representation of the erosion rate versus the particle impingement angle for $Al_2O_3$ and 304 SS. It can be seen from this representation that 304 SS has very good erosion resistance characteristics so long as the angle at which particles impinge the 304 SS is very small. (A small (or low) angle may be defined as one in which the value of the sine of the angle and the value of the tangent of the angle are substantially equal). In other words, as long as the particles flow nearly parallel to the surface of the 304 SS there will be very little wear. It can be seen that as the impingement angle increases, the erosion rate of the 304 SS increases dramatically to the point where impingement at about 16° to the surface of the 304 SS causes very high erosion rates.

It can also be seen that the erosion rate associated with $Al_2O_3$ is approximately linear and increases as the particle impingement angle increases. It is also below the erosion rate of 304 SS for all angles smaller than about 65°.

Figure 2:
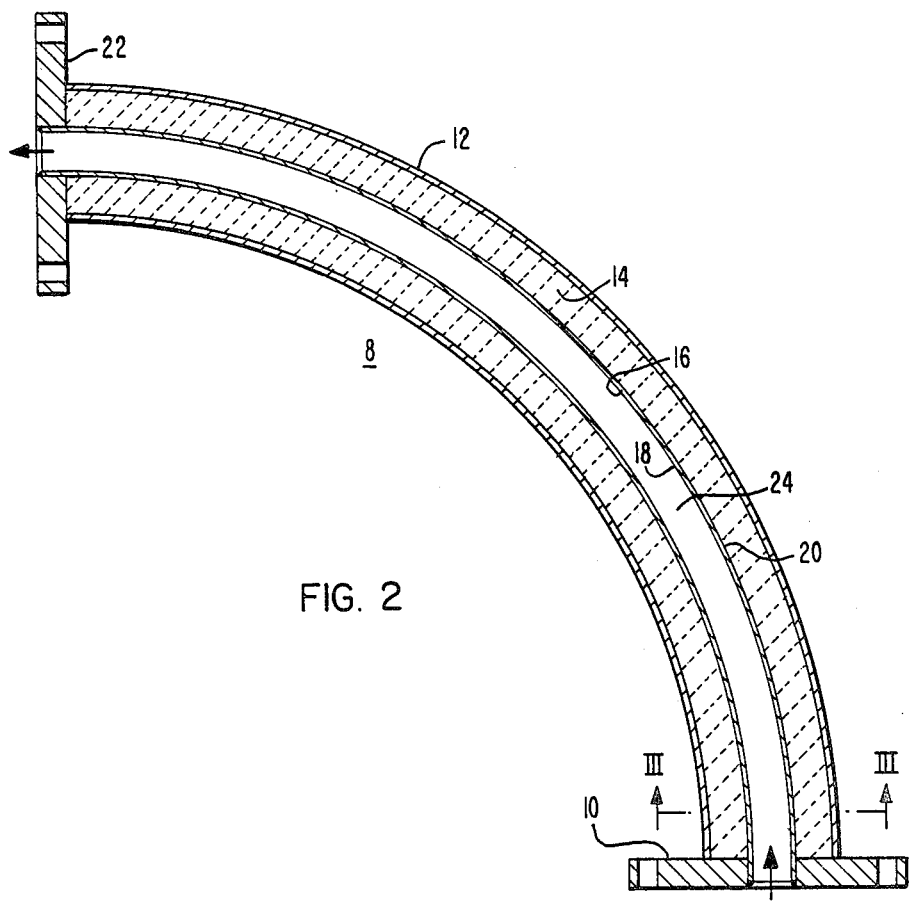
FIG. 2 is a sectional elevation view of a solids conveyancing elbow in accordance with the invention.
Figure 3:
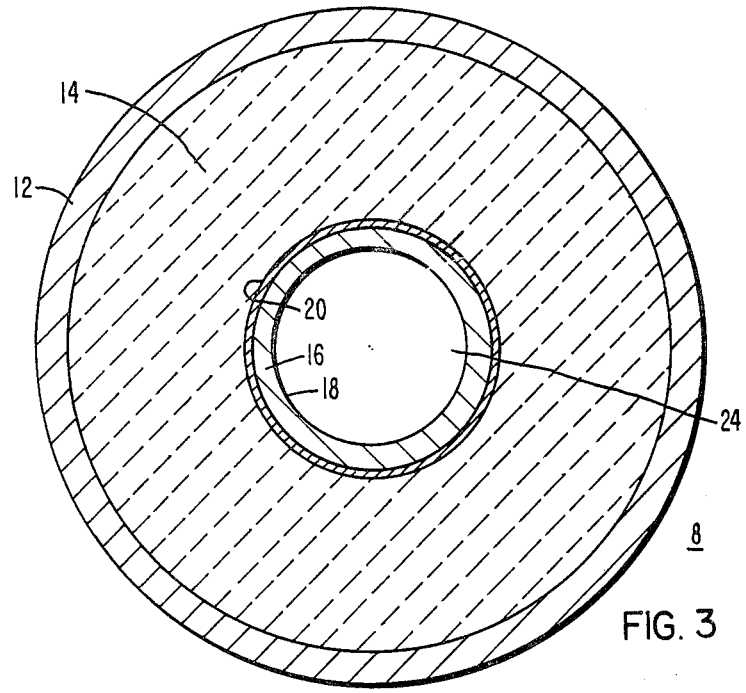
FIG. 3 is a cross section of the elbow in accordance with the invention.

Looking now at FIG. 2, there is shown a solids conveyancing elbow 8 in accordance with the invention. The elbow comprises a first flange 10 which is attached, such as by welding, to outer pipe 12. Outer pipe 12 acts as the pressure boundary for the elbow 8. Adjacent to and inside the outer pipe 12 is a castable refractory ceramic 14. Adjacent to and inside the castable refractory ceramic 14 is an erosion resistant liner 16. The erosion resistant liner 16 is comprised of at least two layers. On the outer side of the erosion resistant liner 16, adjacent to the castable refractory ceramic 14, is an outer layer 20, which is comprised of a material having excellent wear characteristics at low particle impingement angles, such as $Al_2O_3$. On the interior of the erosion resistant liner 16 is an inner layer 18 which is comprised of a material having excellent tensile strength and flexibility characteristics, such as 304 SS. At the opposite end of the elbow 8 from the first flange 10 is a second flange 22 similarly attached, such as by welding, to the outer pipe 12. The erosion resistant liner 16 will typically be attached, such as by welding, to the first flange 10 and second flange 22. In the diametric center of the elbow 8 is a hollow elbow interior 24 through which particulate solids are conveyed.

Performance of the elbow 8 is in the following manner. A solids particulate material is conveyed, typically by entrainment in a moving fluid stream, through the hollow elbow interior 24. As particles impinge on the erosion resistant liner 16, the inner layer 18 begins to erode at a rate corresponding to the impingement angle of the solid particles. If the curvature of the elbow 8 is such that the impingement angle is between 10° and 30°, then the erosion rate of the inner layer 18 will be high. As a result, the inner layer 18 erodes away in local areas, gradually exposing the outer layer 20. The inner layer 18 has therefore acted as a sacrificial material in selected areas, wearing away until the outer layer 20 is exposed, at which time further erosion is substantially slowed as a result of the different erosion rate characteristics.

The refractory ceramic 14 serves several purposes. First, throughout the life of the elbow 8, it provides insulation to reduce heat loss. Second, after the inner layer 18 has worn, it provides structural support to the outer layer 20, which is generally very thin.

It can be seen that in the design of the elbow several factors are of importance. First, as the radius of curvature of the elbow becomes smaller, the particle impingement angle without flow discontinuity will become greater. As a result, the wearing away of the sacrificial layer will occur later in time. This may result in a longer lifetime for the elbow 8 since the erosion rate for a material such as 304 SS is lower at greater angles, but it nevertheless has drawbacks. As the radius of curvature R becomes smaller two problems become prominent. First, the pressure drop increases, requiring greater initial pressure to convey the particle stream. Second, the number of impingements by individual particles increases, resulting in a decrease in particle velocity. At reduced velocities, a greater amount of particles will settle out. Thus, a higher fluid flow rate is required. In a preferred mode, the curvature of the elbow 8 will be such that the particle impingement angle will normally be less than 30° and more preferably, approximately 10°. The liner 16 would be installed in a normal long radius outer pipe 12, that is, the outer pipe 12 will have a bend radius R of three times the outer pipe 12 internal radius $r'$ ($R=3r'$). The liner 16 will have the same bend radius R as the outer pipe 12. In the preferred mode, the liner 16 will have an internal radius r which is about $\frac{1}{3}$ to $\frac{1}{4}$ the internal radius $r'$ of the outer pipe 12, due to the refractory ceramic 14. Therefore, the radius of curvature of the elbow 8 will be:

$R=3r'$, but $r'=3r$ to $4r$, therefore $R=9r$ to $12r$.

The actual bend radius R chosen for a particular application will be a compromise between the higher pressure drop and smaller flow rates of a small radius of curvature, versus the size constraints in a particular application of a very large radius of curvature.

Second, the thickness of the inner layer 18 and the outer layer 20 may be varied to increase the lifetime, since a thick layer would last longer than a thin layer. In general, it is desirable that the outer layer 20 be as thick as possible, but this is currently limited in the state of the art to approximately 0.070 inches or less. As an example, the thickness limitation for $Al_2O_3$ is 0.020 inches.

Third, in addition to the use of 304 SS as an inner layer 18, any material which has a high tensile strength and high flexibility at high temperature may be used, provided it is compatible with the transport gas used. Some other examples of acceptable materials are 316 SS, 321 SS, 347 SS, any Cr-Mo steel or any nickel alloy commonly called Incoloy. Such materials are especially desirable because of their favorable pipe fabrication qualities.

Fourth, there are several materials which are acceptable substitutes for use in the outer layer 20 in place of $AL_2O_3$. For instance, any of the Co-Ni-W alloys commonly known as stellite, any Cr-C alloys (chromium carbides), any W-C-Co alloys (tungsten carbides), or any $Cr_xO_y$ (chromium oxides). Important concerns with respect to the outer layer 20 material are that it be compatible with the transport gas, that it have excellent erosion resistance with respect to angles of impingement which will be encountered in the elbow in which it is used, and that it can be applied to the inner layer 18.

It can be seen from the above that considerations of available space in which to place the elbow, required life span and acceptable fabrication materials with necessary thicknesses of the inner layer 18 and outer layer 20 will all enter into the design considerations of the elbow 8.

The elbow 8 may be constructed in the following manner. (1) A section of tubing, which will become the inner layer 18, is formed, such as by bending or forging, to the appropriate radius of curvature R. This tubing is made of any material acceptable for use as the inner layer 18. (2) A material which is acceptable for use as an outer layer 20 is applied to the exterior of the formed tubing. Such an application may be hot or molten application such as by flame spraying or by plasma spraying or any other such application as is well known in the art. The thickness of this layer will normally be as thick as possible in the state of the art with respect to the material being applied. This assembly is now the erosion resistant liner 16. (3) The liner 16 is attached, such as by welding, to a first flange 10. Since the flange 10 will not normally be exposed to the erosive effects of the particle stream, there are no particular wear characteristics required of it. It should, however, be compatible with the outer pipe 12 material and be capable of withstanding the pressure for which the overall elbow 8 is designed. (4) The outer pipe 12, which may be of any acceptable piping material such as carbon steel, is formed, such as by bending or forging, to the same radius of curvature R as the liner 16. As is the case with the first flange 10, the outer piping will not normally be exposed to the erosive effects of the particle stream. However, it should be capable of withstanding the pressure for which the elbow 8 is designed. (5) The liner 16 is then inserted into the outer pipe 12 and the outer pipe 12 is attached to the first flange 10 in a manner similar to the attachment of the liner 16 to the flange, i.e., such as by welding. (6) A castable refractory ceramic material 14 is injected between the liner 16 and the outer pipe 12 and is allowed to set or cure. It is important that there be no air bubbles in the ceramic material, particularly adjacent to the exterior of the liner 16. (7) The second flange 22, which is generally of the same material as the first flange 10, is attached, again such as by welding, to the outer pipe 12 and the liner 16.

Figure 4:
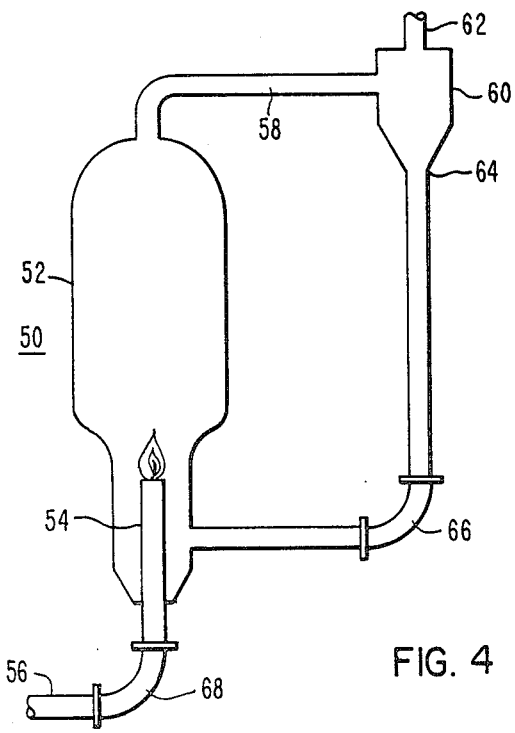
FIG. 4 is a representation of a gasification system in accordance with the invention.

Looking now at FIG. 4 there is shown a gasification system 50 comprising a vessel 52, a nozzle 54 for the gasification of coal particles, which nozzle is fed coal and process mediums through coal conveyance system 56. This coal conveyance system 56 conveys coal particles typically by entraining them in a gaseous medium. Product gas from the gasification process is discharged from the vessel 52 through product gas outlet 58 and is conveyed into separator 60. Clean gas is discharged from the separator 60 through the clean gas discharge 62 while particulate material entrained in the product gas is discharged from the separator 60 through the particle discharge 64. The particles may be discharged from the system 50 or alternatively, as is shown in FIG. 4, reinjected into the gasifier by some means which conveys the particles in a gaseous medium. The use of the erosion resistant elbows 66 and 68 is shown in FIG. 4. Elbow 66 is placed in the path for reinjecting particles into the gasifier. Additionally, elbow 68 is shown in use in the coal conveyance system 56.

I claim:

1. An elbow for use in particulate material conveyancing comprising: an outer pipe having a radius of curvature R; an inner pipe having an internal radius r, a radius of curvature R, and concentric with and internal to said outer pipe, said inner pipe comprising an outer layer comprised of a first material and an inner layer comprised of a second material; wherein said first material is characterized by high erosion resistance when impinged by particulate material and wherein said second material is characterized by high tensile strength and flexibility; and, inner pipe supporting means for providing support to said inner pipe, said means disposed between said inner pipe and said outer pipe.

2. The elbow in accordance with claim 1 wherein said first material is selected from the group consisting of $Al_2O_3$, an alloy of Co-Ni-W, an alloy of Cr-C, an alloy of W-C-Co, and $Cr_xO_y$.

3. The elbow in accordance with claim 1 wherein said second material is selected from the group consisting of 304 SS, 316 SS, 321 SS, 347 SS, an alloy of Cr-Mo-Fe, and an alloy of Incoloy.

4. The elbow in accordance with claim 1 wherein said inner pipe supporting means comprises a castable refractory ceramic.

5. The elbow in accordance with claim 1 wherein said radius of curvature R is between 9 and 12 times the radius r of said inner pipe.

* * * * *